United States Patent
Etheridge

[15] 3,681,544
[45] Aug. 1, 1972

[54] ANTI-THEFT AUTO SWITCH

[72] Inventor: J. Ray Etheridge, Rt. 3, Box 235, Wilson, N.C. 27893

[22] Filed: April 13, 1971

[21] Appl. No.: 133,500

[52] U.S. Cl. ..................200/44, 70/336, 307/10 AT
[51] Int. Cl. ..................................................H01h 27/00
[58] Field of Search ............70/336, 337; 200/42, 44; 307/10 AT

[56] References Cited

UNITED STATES PATENTS 3,174,003  3/1965  Armstrong.....................200/44
3,174,502  3/1965  Howarth et al. ............200/44 X

*Primary Examiner*—Herman J. Hohauser

[57] ABSTRACT

A switch for installation in an automotive vehicle, the switch preventing theft of the automobile by not allowing the engine to be started unless an exact key is used to trip a latch that holds the fuel valve in an open position, the switch including means to receive either a long key for normal use by a motorist, or a short key that can be surrendered to a parking attendant, the short key allowing the engine to be started so the vehicle can travel on what little fuel is in the carburetor but which does not open the fuel valve for a continuous engine operation.

1 Claim, 5 Drawing Figures

PATENTED AUG 1 1972　　　　　　　　　　　　3,681,544
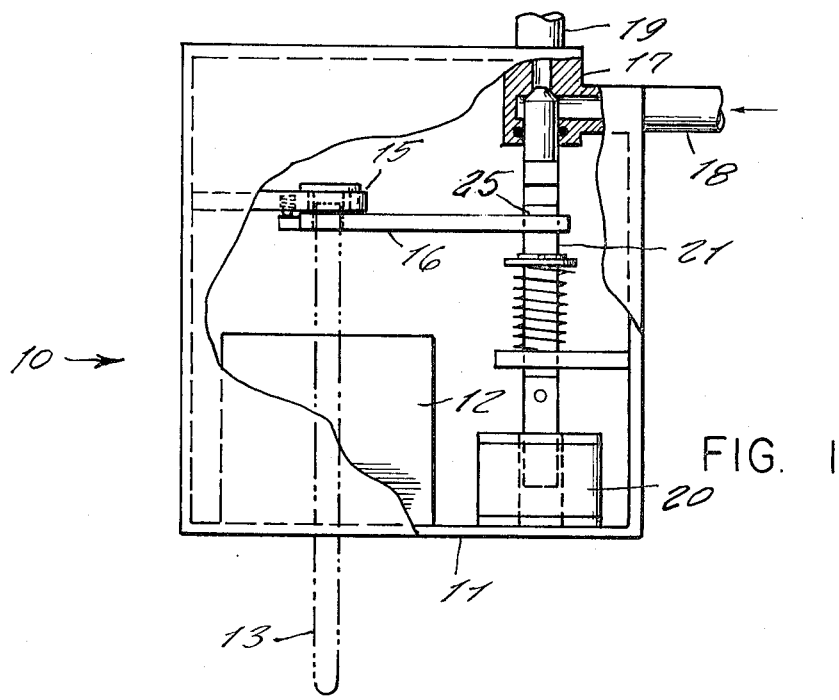
FIG. 1
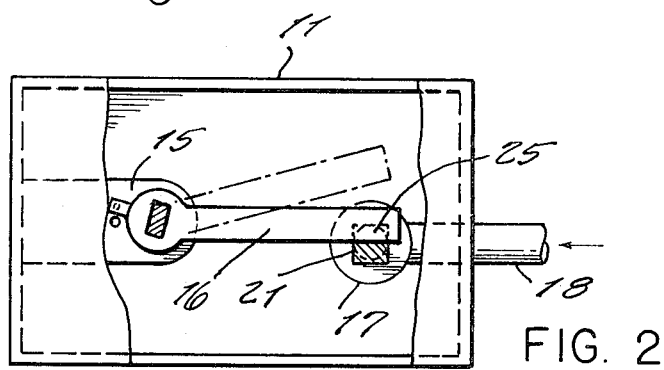
FIG. 2
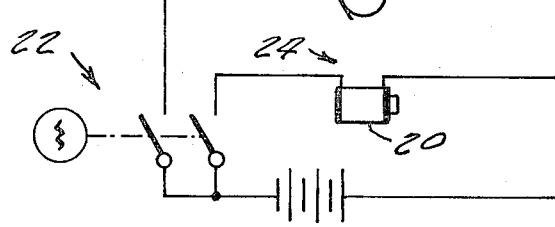
FIG. 4
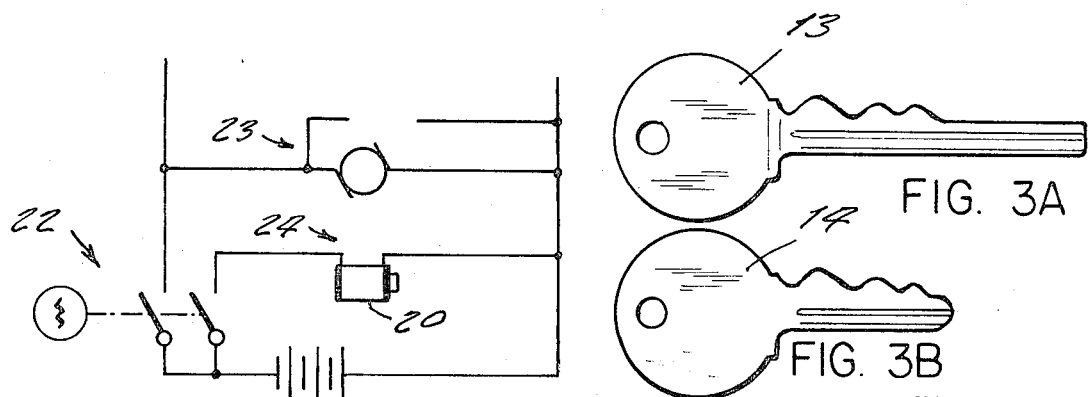
FIG. 3A
FIG. 3B
INVENTOR.
J. RAY ETHERIDGE

ANTI-THEFT AUTO SWITCH

This invention relates generally to automotive vehicles.

It is generally well known that many automotive vehicles are stolen each year because the keys of the vehicle get into the hands of prospective thieves. It is also well known that when a motorist parks his vehicle in a public garage, he is obliged to leave his keys with the attendant, such keys thus being subject getting into the hands of car thieves. This situation is of course objectionable and therefore in want of improvement.

Accordingly it is a principal object of the present invention to provide an anti-theft auto switch for installation in automotive vehicles and which will deter the theft of an automotive vehicle if the prospective thief does not have a proper operating ignition key.

Another object of the present invention is to provide an anti-theft auto switch which accordingly is operative either by a regular key for normal use of the vehicle by the motorist, or by a special key which will permit the vehicle to run for only a short distance of possibly only one or two hundred feet.

Accordingly it is another object of the present invention to provide an anti-theft auto switch wherein a special key is thus available for presentation to a parking attendant at a garage or the like, so that the motorist is confident that his vehicle if needed to be shunted about the parking lot or garage by the attendant cannot be run for more than a few hundred feet, thus being assured that the vehicle cannot be stolen.

Other objects of the present invention are to provide an anti-theft auto switch which is simple in design, inexpensive to manufacture, rugged in construction, easy to use and efficient in operation.

These and other objects will be readily evident upon a study of the following specification and the accompanying drawing wherein:

FIG. 1 is a plan view of the anti-theft auto switch unit shown partly broken away, and showing the key in phantom lines inserted, FIG. 2 is a elevation view thereof shown partly broken away and in cross-section; the figure illustrating the key extended into the latch, the latch engaging the gas flow bar;

FIG. 3A is a side elevation view of a long key,

FIG. 3B is a side elevation view of a short key, and

FIG. 4 is a schematic diagram of an electric circuit operated by the key.

Referring now to the drawing in detail, the reference numeral 10 represents an anti-theft auto switch according to the present invention wherein there is a metal box 11. Within the metal box 11 there is a switch 12 which is adaptable for having either a long key 13 or a short key 14 inserted thereinto.

Within the metal box 11 there is also located a latch 15 which engages a gas flow bar 16. There is also a fuel valve 17 which at one end is connected to a gasoline supply like 18 and which at its other end is connected to a gas line 19 leading to the carburator.

Within the metal box 11 there is also located a solonoid 20 and a slinger 21.

As shown in the electrical circuit at 22 in FIG. 4, the upper portion thereof represents a normal ignition circuitry which includes a starter, coil relay, lights and radio energizing components 23. The solonoid 20 is shown in a separate circuit 24 so that a thief cannot bridge the invention by bridging the normal ignition circuit as shown at 23.

In operative use, the motorist can leave the short key 14 with a parking lot attendant which would allow the attendant to start the automobile and burn the fuel that is left in the carburator which normally would be enough to drive the vehicle a short distance about the parking lot while it is shunted about. The modified key 13 comprising the regular key is kept by the motorist within his own pocket.

In operative use, the modified key 13 is passed through the ignition switch 12 and inserted into the latch 15. When the ignition switch is turned on to start, the start position of the key excites the solonoid 20 which pulls the slinger 21, thus opening the fuel valve 17 and thus allow fuel to pass from line 18 through the fuel valve 17 into the line 19 toward the carburator. When the engine starts, the key is released shutting off the current to the solonoid, the latch falling into a notch 25 on the slinger 21 thus holding the valve 17 open. When the engine is shut off, the key then lifts the latch up causing the slinger which is spring loaded, to close the valve thus shutting off the fuel.

With this device, it would be almost impossible for anyone to start the engine without the exact key to trip the latch and hold the fuel valve open.

What I now claim is:

1. In an anti-theft auto switch, the combination of a metal box installed within an automotive vehicle, said metal box containing an ignition switch, said ignition switch having means to receive either a long key or a short key, one of said keys having means for maintaining the engine of said automobile in a continued operative condition while solenoid other of said keys have means for said engine to run only a relatively short period of time, said metal box also containing a latch at a rear of said switch, said latch having means to be engaged by the end of said long key inserted through said switch, said latch engaging a gas flow bar, said metal box also containing a fuel valve, one end of said fuel valve being connected to an incoming gas line, the opposite end of said fuel valve being connected to a gas line leading to a carborator of said automotive vehicle, a solenoid being contained within said metal box, said solenoid slidably operating a slinger which at one end selectively closes said fuel valve, said slinger having a transverse notch, said transverse notch being selectively engageable by said gas flow bar to arrest said slidable movement of said slinger.

* * * * *